United States Patent [19]

Hickman

[11] Patent Number: 4,965,593
[45] Date of Patent: Oct. 23, 1990

[54] PRINT QUALITY OF DOT PRINTERS

[75] Inventor: Mark S. Hickman, Escondido, Calif.
[73] Assignee: Hewlett-Packard Company, Palo Alto, Calif.
[21] Appl. No.: 385,642
[22] Filed: Jul. 27, 1989
[51] Int. Cl.⁵ .......................................... G01D 15/18
[52] U.S. Cl. .............................................. 346/140 R
[58] Field of Search ........................... 346/75, 140 PD

[56] References Cited
U.S. PATENT DOCUMENTS

| | | | |
|---|---|---|---|
| 4,540,996 | 9/1985 | Saito | 346/140 PD |
| 4,593,295 | 6/1986 | Matsufuji et al. | 346/140 PD |
| 4,622,560 | 11/1986 | Withoos et al. | 346/76 PH X |
| 4,748,453 | 5/1988 | Lin et al. | 346/140 PD X |

*Primary Examiner*—George H. Miller, Jr.
*Attorney, Agent, or Firm*—Roland I. Griffin; Edward Marker, II

[57] ABSTRACT

The quality of the images of dot printers such as ink jet printers (20) is improved by spacing the ink jet nozzles (52) of the print head (50) by an amount greater than the pixel spacing of the printing medium (22), and operating the sources in a manner such that adjacent pixels are not printed until the deposited colorant has time to dry. In the traversing direction (39), neighboring pixels are not printed on the same traversing pass. In the advance direction (32), by making the spacing of the ink jet nozzles (52) an integer multiple of the pixel spacing and advancing the print head (50) by a different integer multiple of the pixel spacing, the pixel patterns can be readily printed with high printing volume and with a constant incremental advance of the print head. The present approach is applicable to both color and black-and-white printing, but particular improvement is found for color printing.

9 Claims, 3 Drawing Sheets

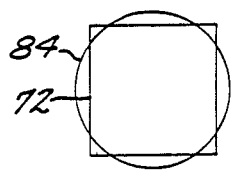
FIG.4
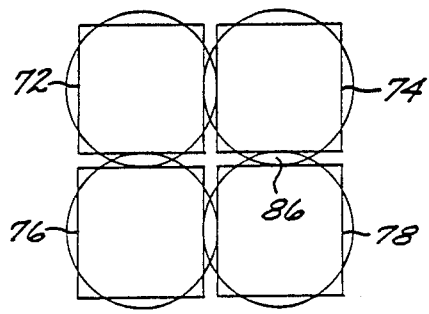
FIG.5
FIG.6
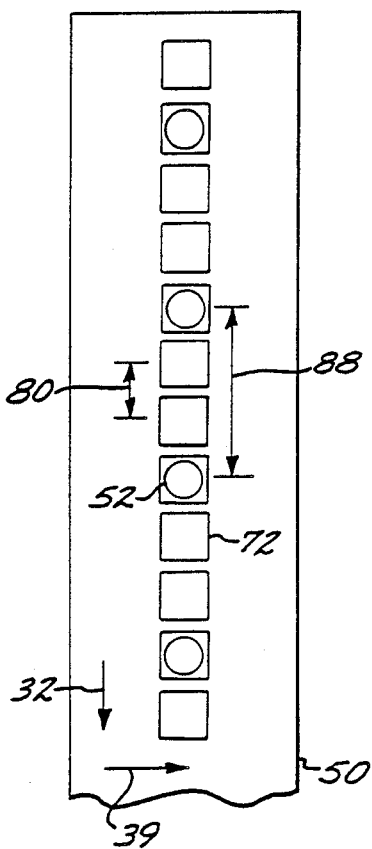
FIG.7
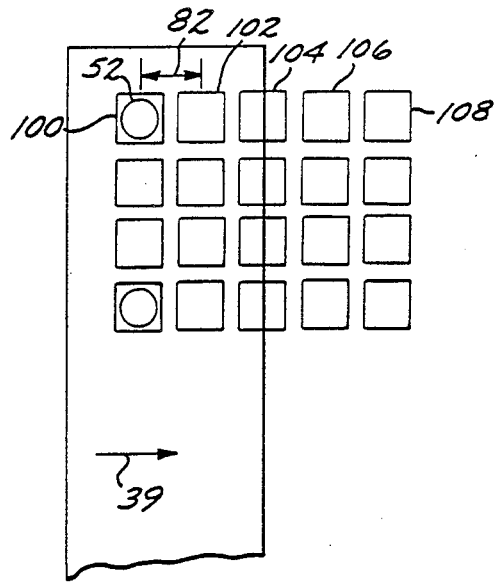

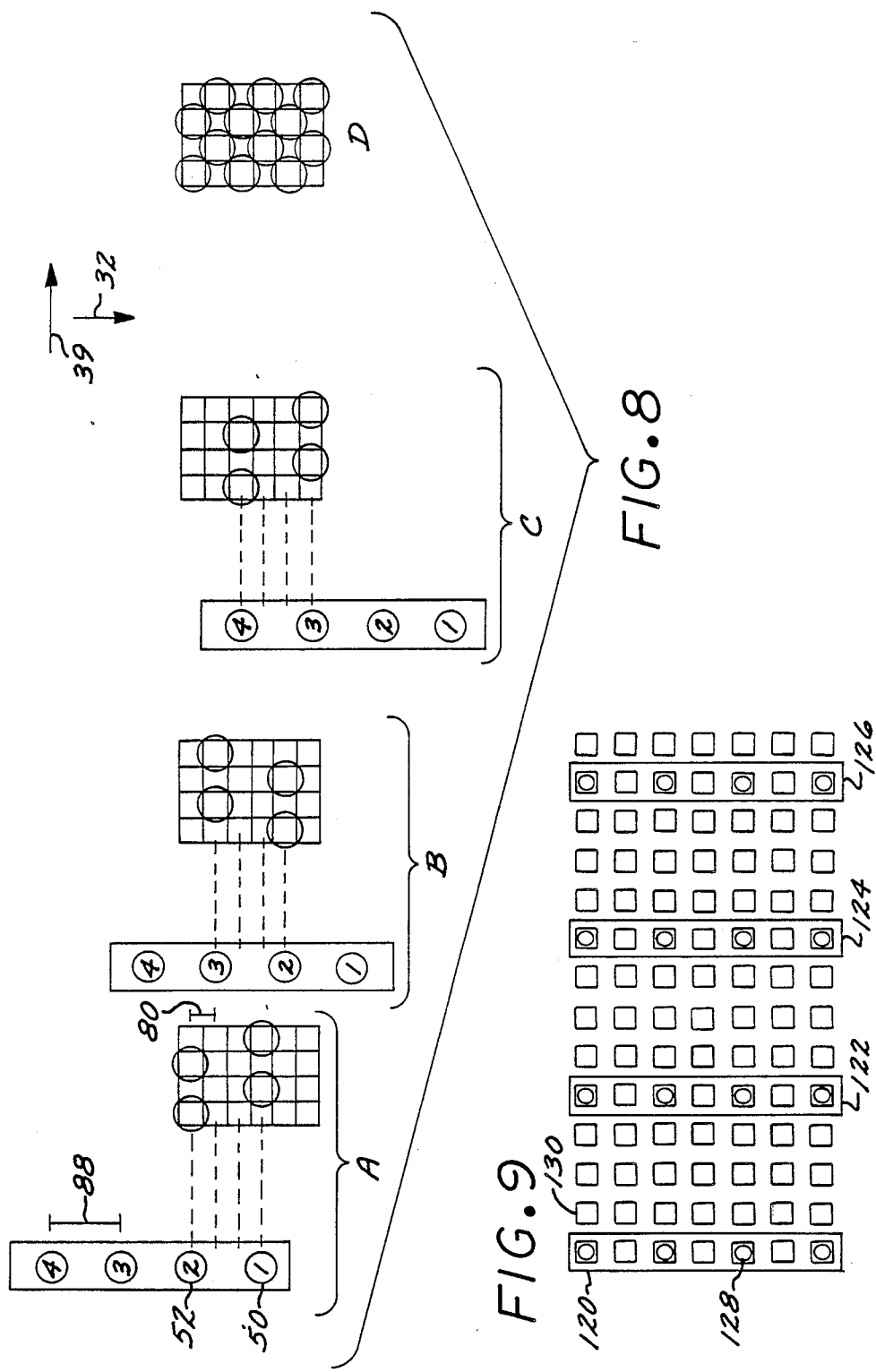

PRINT QUALITY OF DOT PRINTERS

BACKGROUND OF THE INVENTION

The present invention relates to the improvement of the image quality of printers that produce images by an array of printed dots, and, more particularly, to improved image quantity for ink jet printers.

Printers are devices that print images onto a printing medium such as a sheet of paper. Printers of many types are available, and are commonly linked to a computer that supplies the content of the images, in the form of text, characters, or figures, that are to be printed.

A dot printer forms the image by printing a pattern of individual dots on particular locations of an array defined for the printing medium. The locations are conveniently visualized as being small squares or circles in a rectilinear array. The locations are termed "pixels", and the array is termed the "pixel array". Thus, the printing operation can be viewed as the filling of the correct pattern of pixels of the pixel array with a colorant. This type of image formation is similar to that used for photograhic images in newspapers.

An ink jet printer forms small droplets of a colorant such as an ink or a dye that are ejected toward the printing medium. The droplets are ejected from a print head that has an array of nozzles therein. In a familiar type of ink jet printer, the print head is traversed back and forth across the face of the printing medium to print a swath, and the printing medium is incrementally advanced periodically so that the nozzle array can pass over another swath. The electronic driving circuitry of the printer commands the individual nozzles to eject small droplets of colorant at the appropriate points to fill the proper pixels of the desired pixel array, and also controls the traversing and advance functions of the printer.

Since the image is built up incrementally from thousands of dots, the quality of the image is ultimately dependent upon the quality of the individual dots and their interrelationship with each other. Desirably, each dot would be a generally circular, well formed spot of dried colorant, and each dot would fill its proper pixel to the pixel boundaries without extending into neighboring pixels.

A number of factors can prevent the formation of such a desirable array of dots. One problem is the bleeding of droplets into each other during printing. Thus, if two neighboring pixels are to be printed, two droplets of colorant are deposited as the print head passes. The volume of colorant may be so large that the droplets flow or bleed into each other before they can dry. A portion of the large volume of liquid may flow out of the intended pixels into other areas by the wicking action of the paper. The result may be run-together and improperly formed pixel dots. The problem is compounded when there are multiple pixels formed adjacent each other before drying occurs, so that the printing medium becomes saturated with the pool of colorant.

While present in black-and-white printing, the pixel bleeding problem is of particular concern in color printing. Since secondary colors are formed by the overprinting of primary colors, bleeding from one pixel to another can be especially severe at boundaries between secondary colors. Even though the individual droplets are small, the color bleeding may be readily discerned by the eye that views the completed image.

To reduce color bleeding, special highly absorbent papers have been developed that cause the colorant to dry before substantial movement by wicking or flow can occur. While effective, such an approach has the drawback that the use of untreated or plain paper does not yield the best performance of the printer. In another approach to solving the color bleed problem for color images that is widely used, the various color pens can be offset slightly from each other along the traversing direction, so that a first ejected droplet of colorant of one color has a chance to dry before the next droplet is deposited. The offset of the pens in the traversing direction cannot normally be large enough to permit complete drying, so that some color bleed problem remains.

In yet another approach, the pixels are printed in a first checkerboard pattern and then an overlapping checkerboard pattern displaced by one pixel spacing from the first pattern to fill the entire image. The color bleed problem between the colorant dots that are adjacent in the traverse direction or the advance direction is reduced, but in each case a diagonally oriented pixel is printed on the same traverse, so that colorant bleed may occur along that diagonal. Printer throughput is halved using this approach, unless scan speed is increased, which increases the size and cost of the printer.

In yet another approach set forth in U.S. Pat. No. 4,540,996, the nozzles are spaced at a multiple of the pixel spacing, and the print head is advanced by another multiple of the pixel spacing. Relief is provided as to bleeding of the different colors from pixel to pixel in the advance direction, but there is no indication of a reduction in colorant bleeding from pixel to pixel in the traversing direction.

There exists a continuing need for an improved dot printing strategy for black-and-white and color dot printers such as ink jet printers. The present invention fulfills this need, and further provides related advantages.

SUMMARY OF THE INVENTION

The present invention provides a printing procedure that significantly reduces colorant bleeding between pixels aligned along the traversing direction, pixles aligned along the advance direction, and pixels aligned along pixel diagonals. The printing source elements operate at full output, so that a high throughput is maintained. The approach is operable for both black-and-white printing using single pen and color printing using multiple pens.

In accordance with the invention, a dot printer with capability to print dots onto an array of pixels having a first fixed spacing in an advance direction and a second fixed spacing in a traversing direction, comprises a print head having at least two pixel dot sources, the spacing between adjacent pixel dot sources in the direction parallel to the advance direction being equal to the first fixed pixel spacing times a first multiple that is an integer greater than one; means for moving the print head relative to the printing medium in the traversing direction to form rows of printed pixels and in the advance direction; and a controller that directs the movement of the means for moving and the printing of dots onto the printing medium by the print head, the controller including an advance controller that directs the means for moving to move the print head relative to the printing medium in the advance direction by the first fixed spacing times a second multiple that is an integer greater than one and selected such that the ratio of the first multiple to the second multiple is an irreducible fraction, a traverse controller that directs the means for moving to move the print head relative to the printing medium in the traversing direction, and a printing controller that directs the pixel dot sources to operate at pixel row locations that are displaced in the traverse direction from those in the adjacent row by the second fixed spacing times a third multiple that is an integer greater than one.

Thus, in the printer of the invention, no pixel locations adjacent to each other are printed on the same traverse by a print head. (As used herein, "adjacent" pixel locations are those that are neighboring along the traverse, advance, or diagonal directions. If the pixel array is visualized as a rectilinear array of square pixel locations, then "adjacent" pixel locations are those having the edges or corners of the squares in contact.)

When pixel locations are printed in this manner, the colorand has a period of time to fix on the printing medium, usually by evaporation of the liquid portion of the colorant and/or distribution over an area by wicking action, before colorant is deposited upon an adjacent pixel location. This approach reduces the tendency for intermixing of colorants from adjacent pixel locations, and also reduces the overloading of the printing medium with too much colorant in any location and the associated cockle of the printing medium.

Spacing of the pixel dot sources of the print head by a multiple of the pixel dot spacing in the advance direction aids in attaining this reduction in colorant bleeding, while maintaining full throughput of the printer. It would, of course, be possible to operate only some fraction of the dot sources to attain a similar effect, but then the throughput of the printer would be reduced by that fraction, inasmuch as the total number of pixels to be printed on the page would still have to be printed. Moreover, equal advances in the advance direction can be used with this arrangement of the print sources on the print head, which facilitates accurates placement of the colorant droplets.

The invention also extends to a process for printing the pixel locations with colorant. In accordance with this aspect of the invention, a process for depositing droplets of a colorant onto an array of pixel locations on a printing medium, the pixel locations having a fixed spacing in an advance direction, comprises the steps of furnishing a print head having at least two colorant sources, the spacing between adjacent sources in the advance direction being a integer multiple of the fixed pixel spacing greater than one; traversing the print head across the face of the printing medium in a traverse direction perpendicular to the advance direction, simultaneously depositing droplets of the colorant such that colorant is not deposited onto tranversely adjacent pixels by the colorant sources; and advancing the print head in the advance direction by an amount different from the advance direction spacing of the colorant sources.

More generally, a process for printing dots onto an array of pixel locations on a printing medium, the pixel locations being spaced from each other along an advance direction by a fixed amount, comprises the steps of furnishing a print head having at least two dot print sources that print dots of a liquid colorant onto the printing medium, the liquid colorant having a fixing time for stabilization on the printing medium, the spacing between adjacent dot print sources in the advance direction being a multiple of the fixed pixel spacing, where the multiple is an integer greater than one; and printing the dots onto the pixel locations such that no adjacent pixels are printed within a time period less than the fixing time of the colorant on the printing medium.

The present invention provides an advance in the art of printing dots onto printing media in order to form images. Bleeding of colorant between adjacent pixels is reduced, resulting in truer images. Other features and advantages of the invention will be apparent from the following more detailed description of the preferred embodiment, taken in conjunctions with the accompanying drawings, which illustrate, by way of example, the principles of the invention.

BRIEF DESCRIPTION OF THE DRAWINGS

FIG. 4 is a plan view of a single pixel location with a colorant dot superimposed;

FIG. 5 is a plan view of four pixel locations with superimposed colorant dots;

FIG. 6 is a schematic plan view of the print head overlying pixel locations;

FIG. 7 is a schematic plan view of the print head overlying an array of pixel locations;

FIG. 8 is a series of three schematic plan views of the results of each traverse of printing an array of pixel locations using the approach of the invention (FIGS. 8(A)–8(C)) and the result of the three traverses (FIG. 8(D)); and FIG. 9 is a schematic plan view of four print heads overlying an array of pixel locations.

DETAILED DESCRIPTION OF THE PREFERRED EMBODIMENT

Figure 1:
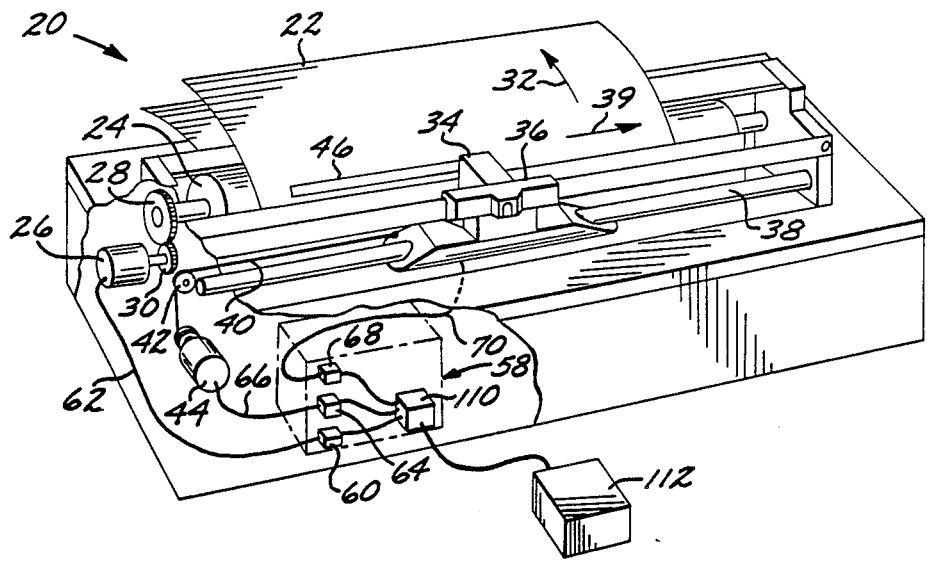
FIG. 1 is a perspective view of a thermal ink jet printer.

In its preferred form, the present inventon provides a thermal ink jet printer and a process for its operation. The components of an ink jet printer 20 are illustrated in FIG. 1. The printer 20 supports a sheet of a printing medium 22 on a platen 24, in much the same manner as a typewriter supports a sheet of paper. The platen 24 is connected to an advancing motor 26 through a gear 28 on the end of the platen 24 and a gear 30 on the motor shaft of the motor 26. Turning of the motor 26 causes the platen 24 to turn, thereby advancing the printing medium 22 in an advance direction 32.

A cartridge 34 is supported on a carriage 36 that in turn is mounted on a rail 38 extending in a traversing direction 39 perpendicular to the advance direction 32. The carriage 36 is pulled along the rail 38 by a cable 40. The cable 40 extends over a pulley 42 and to a traversing motor 44. A second cable extending from the other side of the carriage (not shown) pulls the carriage in the other direction. In operation, the carriage 36 moves the cartridge 34 back and forth, from left to right and right to left in the view of FIG. 1, to print swaths 46 of dots on the printing medium 22. As depicted in FIG. 1, the carriage is moving from left to right, and has printed a portion of the swath 46. Upon completion of a swath 46, the advancing motor 26 operates to advance the printing medium and position it for the printing of another swath. In some instances, the cartridge 34 may pass over the same swath more than once between advances of the printing medium. Together, the advancing mechanism and the traversing mechanism provide the movement of the cartridge 34 relative to the printing medium 22.

Figure 2:
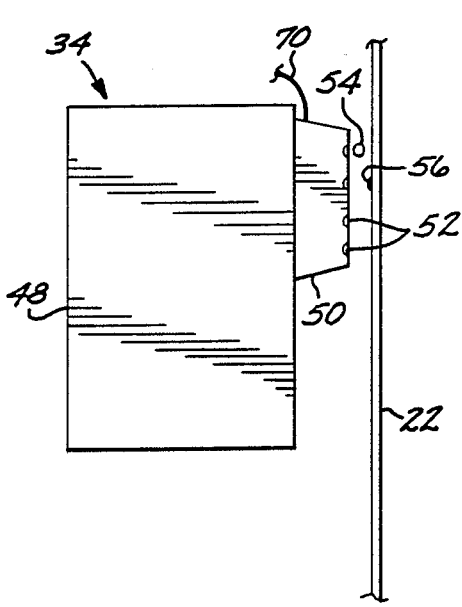
FIG. 2 is a side view of the printer cartridge in relation to the printing medium.

FIG. 2 is a side view of the cartridge 34 in relation to the printing medium 22. The cartridge 34 includes a reservoir 48 that contains a supply of colorant. A print head 50 is mounted on the reservoir 48. The print head 50 has a number of colorant ejection nozzles 52 thereon, positioned in facing relationship with the printing medium 22. Upon command, colorant is ejected from a nozzle 52 as a droplet 54. In a thermal ink jet printer, there is a small electrical resistor below each nozzle 52 which heats and vaporizes a volume of colorant. The vapor bubble drives the droplet 54 out of the nozzle 52 toward the printing medium 22. To operate the nozzle, an electrical current is passed through the resistor. The droplets 54 contact the printing medium 22, and become fixed thereon as dots 56. The dots, when viewed together, form the image that is printed on the printing medium 22. Colorant flows through internal passages from the reservoir 48 into the print head 50 and to the nozzles 52 to replenish that which is ejected.

The hardware of the control system for the printer 20 is illustrated in FIG. 1. A controller 58 includes an advance controller 60 that operates the advancing motor 26 through an electrical cable 62, a traverse controller 64 that operates the traversing motor 44 through a cable 66, and a printing controller 68 that sends a pulse of energy to the appropriate nozzle 52 through a cable 70. The controller 58 coordinates the operation of the controllers 60, 64, and 68 to achieve the proper pattern of dots 56 on the printing medium 22.

In analyzing the printing of dots onto a printing medium, one approach is to characterize the sheet of printing medium as having an array of pixel locations onto which dots of colorant are printed. When discussing black-and-white printing, it is sufficient to state that black dots are printed onto some of the pixel locations, and not onto others. For color printing, the situation is more complex, because some pixel locations receive no colorant, some receive dots of one colorant to form a primary color, and some receive dots of two colorants, one superimposed over the other, to form a secondary color. To perform color printing, four print heads 50 and four separate sets of nozzles 52 are used. The present invention is equally applicable to monochrome and color printing.

Figure 3:
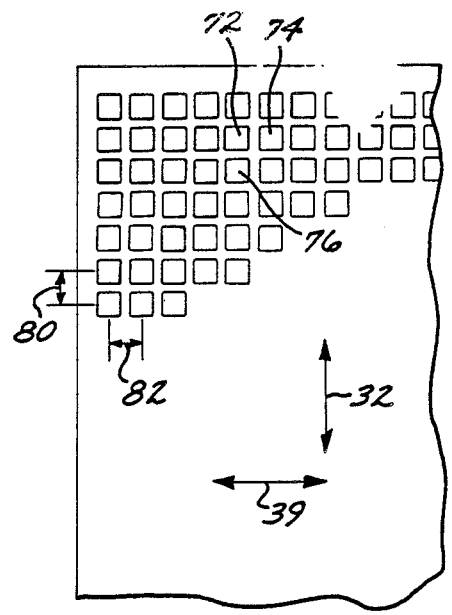
FIG. 3 is a plan view of an array of pixel locations on a page of printing medium.

FIG. 3 illustrates the array of pixel locations on the sheet of the printing medium 22. The pixels are visualized as squares arranged in a rectilinear array, with the side of each square parallel to that of the neighboring square and parallel to the traverse direction 39 and the advance direction 32. As explained, neighboring pixels in the traverse direction, such as pixel locations 72 and 74, and neighboring pixels in the advance direction, such as the pixel locations 72 and 76, and neighboring pixels in the diagonal direction, such as pixel locations 74 and 76, are termed "adjacent" pixels.

The array of pixels is further characterized by a first fixed pixel spacing 80 in the advance direction 32, and a second fixed pixel spacing 82 in the traverse direction 39. These are the respective center-to-center distances between the pixels in the advance direction, such as the pixels 72 and 76, and between the pixels in the traversing direction, such as the pixels 72 and 74. The first and second pixel spacings 80 and 82, respectively, are often the same, and extablished by industry-wide standards to facilitate the communication between the computer and the printer. A currently common industry standard is that the spacings 80 and 82 are equal to each other, and to 1/300 inch. The distance between non-adjacent pixels is always greater than the minimum pixel spacing of adjacent pixels.

As the printer 20 operates, a portion of the pixel locations receive a droplet of colorant, forming a dot at that pixel location. As illustrated in FIG. 4, it is the objective to fill each pixel 72 fully, but not overfill the pixel, with a colorant dot such as a dot 84. The dots 84 are roughly circular when they fix onto the printing medium 22. If the amount of colorant is selected to nearly fill the pixel along its diagonal, as is required to create a "solid" fill of colorant without white spaces showing through, there will usually be some overlap 86 with neighboring pixels, as illustrated in FIG. 5. In this illustration, the dots on neighboring adjacent pixels such as 72 and 74 overlap, but those on pixels diagonally related, such as pixels 72 and 78, do not overlap. However, there may be overlap between diagonal pixels in other cases.

When a droplet of colorant is deposited upon the pixel, it is liquid and therefore can flow. A fixing time is required for the droplet to transform to a solid. Fixing is usually by drying of liquid from the colorant to leave the color pigment or stain, but wicking and expanding of the dot may also contribute to fixing.

Where the droplets geometrically overlap, as at numeral 86, prior to fixing of the dot, colorant can bleed from one pixel to the adjacent pixel. There is less such bleeding of colorant between diagonally related pixels, but some bleeding often exists when the dots are misplaced or of larger than ideal size. Pixels having an "adjacent" relationship, as defined herein, may suffer from colorant mixing and bleeding, if those pixels are printed prior to the time that the droplets deposited upon the adjacent pixels have time to fix, or become dried so that they do not intermix as liquids. The fixing time for the colorant varies according to the nature of the colorant, the droplet volume, and the nature of the printing medium.

The present invention provides that a pixel adjacent to another pixel should not be printed prior to the time that the colorant on the first pixel has the opportunity to fix, and become solid. Such a result could be accomplished by printing a checkerboard pattern with a conventional print head, but the throughput of the printer would be reduced.

Instead, the invention provides that a spacing 88 between nozzles 52 of the print head 50, in the direction parallel to the advance direction 32, should be a multiple of the first pixel spacing in the advance direction 80, where the multiple is an integer greater than one. As shown in FIG. 6, with this arrangement it is physically impossible for pixel locations that are adjacent in the advance direction or the diagonal direction to be printed on the same pass of the print head in the traverse direction. In FIG. 6, the pixels are indicated by squares and the nozzles 52 by circles, and the plan view shows both the pixels 72 on the printing medium 22 and the nozzles 52 on the printhead 50. The spacing 88 between nozzles 52 can be as small as two times the pixel spacing 80, or a larger multiple. In FIG. 6, a multiple of three was used for illustration.

To avoid the liquid intermixing and bleeding of droplets on pixels adjacent in the traverse direction, the printing controller 68 is programmed so that no nozzle 52 may operate to deposit a droplet on traversely adjacent pixels. Alternatively stated, after a nozzle 52 has deposited a droplet upon a pixel, the print head 50 must move by a distance that is a multiple of the second pixel spacing 82 in the traverse direction, where the multiple is an integer greater than one.

Referring to FIG. 7, as the print head 50 moves in the traversing direction 39, only selected pixels may be printed by a particular nozzle 52. If a droplet is deposited at pixel location 100 by nozzle 52, then no droplet may be deposited at the traversely adjacent pixel location 102. Another droplet may be deposited at pixel location 104, which is not the traversely adjacent pixel relative to pixel location 100. If, then, a droplet is deposited at pixel location 104, no droplet may be deposited at pixel location 106, but a droplet may be deposited at pixel location 108. Under this scheme, a droplet is deposited at every other pixel location in the traversing direction 39, if the image calls for such a pattern. Other schemes are possible, with droplets deposited at every third pixel location, for example.

From the approaches just described, it is apparent that droplets will never be deposited upon adjacent pixel locations using the present invention. Adjacent pixels can receive colorant only on subsequent traverses, at the earliest. If the fixing time for the colorant is longer than the time required for a traverse, then the alternative approach of deposition on every third pixel location may be used.

Using the approach of the invention, a higher quality array of dots on pixel locations is obtained, because colorant bleeding and intermixing is reduced.

The present approach yields important advantages in maintaining high throughput of printed matter and permitting flexibility in printing style. FIG. 8 illustrates the printing of a check or rough image, wherein only half of the pixel locations are printed. In this case, the nozzle spacing 88 is three times the first pixel spacing 80. As the print head 50 moves in the traverse direction 39, a dot is deposited at most on every other pixel location.

FIGS. 8(A)-8(C) illustrate the pixels filled with colorant on the first three traverses respectively, and FIG. D shows the filled pattern after the three traverses. The result is a check pattern. The remaining pixels could be filled with colorant to produce a high-quality image by either of two approaches. In one, the printing medium 22 would not advance at the end of each traverse, but instead would remain stationary for two traverses of the print head 50. The alternating pattern of pixels would be printed on the reverse pass in each case. However, the advance would remain the same in each case, when the advance did occur.

In the second approach, the nozzles could have been supplied in a larger group, as for example eight nozzles in a row rather than four. In that case, the pattern of remaining unfilled pixels in FIG. 8(D) would be filled by continuing the regular advance to bring the fifth through eighth nozzles (not shown) into play in the area depicted in the drawing. These additional nozzles would operate in the same pattern illustrated in FIGS. 8(A)-8(C), except displaced by the second pixel spacing to the right or the left, to fill the pattern completely.

Such a print head can be operated to eject colorant at the full number of locations possible during a traverse, while not remaining inactive during printing operations due to the need to skip pixels as a result of the printing strategy adopted to avoid mixing and bleeding of colorant. The printer output remains as great as in the case where no such strategy is used, and there is the advantage that the quality of the dots is improved.

The advance, traverse, and print operations are readily controlled by a programmed microprocessor 110 built into the controller 58, as shown in FIG. 1. The microprocessor 110 receives an image that has been composed by an external computer 112. The controller 64, under control of the microprocessor 110, drives the traversing motor 44 to move the carriage 36 and print head 50 at optimal speeds usually determined empirically by the characteristics of the printer, the droplet volume, the fixing behavior of the colorant, and the fixing behavior (such as absorbency) of the printing medium. These values would be input by the user of the printer and/or programmed into the microprocessor when it is constructed. For example, the user might be permitted to indicate whether plain paper, coated paper, or vellum is being used as the printing medium, because the fixing behavior of the colorant on the medium would depend upon which of these alternatives was used.

To control the printing operation, the microprocessor performs a pixel-by-pixel logical AND operation with the image to be printed and the permissible pixel printing locations as determined by the rules set forth hereinabove. The resulting table of pixels to be printed is provided to the printing controller 68 on a swath by swath basis, and in turn output at the proper point in each traverse to the resistors within the nozzles.

The movement of the advance motor 26 is determined by the microprocessor 110 according to the rules set forth herein. In the example of FIG. 8, the advance was uniform and equal to four pixel spacings, or 4/300 inch under the current standard. In a practical printer, there would normally be a larger number of nozzles in the array, and the amount of the advance would be accordingly larger. Under some printing strategies, as discussed herein, there would be no advance after some traverses, and the microprocessor would also provide this information to the advance controller 60. It is particularly advantageous to make equal advances when advances are made, and the present printing strategy was selected with that consideration in mind.

The preceding discussion has been directed primarily toward a single monochrome printing scheme, but it is equally applicable to color printing using multiple, usually four, sets of nozzles, each set printing one of the primary colors. In the preferred approach for color printing, illustrated in FIG. 9, four print heads 120, 122, 124, and 126 each eject colorant of a different primary color. In this illustrated case, the spacing between nozzles 128 (depicted as circles) is twice that between pixels 130 (indicated as squares) in the advance direction. The respective sets of nozzles for the four print heads are side by side and in register, so that each pixel is printed with all required colors on each traversing pass. Pixels to be printed in primary colors receive a single droplet of colorant, while pixels to be printed in secondary colors receive two droplets of colorant, from two of the print heads. The previously stated rules ensuring that adjacent pixels are not printed in a single pass are followed in this and other color printing circumstances, also. The sets of nozzles are not be offset in the advance direction in this preferred approach.

The present invention has been illustrated in relation to a particular type of printer and relatively small numbers of nozzles, for the sake of clarity, but the invention is not so limited. Although particular embodiments of the invention have been described in detail for purposes of illustration, various modifications may be made without departing from the spirit and scope of the invention. Accordingly, the invention is not to be limited except as by the appended claims.

What is claimed is:

1. A dot printer with the capability to print dots in a pixel array on a printing medium, said pixel array having a first fixed spacing in an advance direction and a second fixed spacing in a traverse direction, comprising:

a printhead having at least two pixel dot sources, the spacing between adjacent pixel dot sources in the direction parallel to the advance direction being equal to the first fixed pixel spacing times a first multiple that is an integer greater than one;

advance control means for moving the printing medium relative to the printhead in the advance direction by the first fixed spacing times a second multiple that is an integer greater than one and selected such that the ratio of the first multiple to the second multiple is an irreducible fraction;

traverse control means for moving the printhead relative to the printing medium in the traverse direction, and a printing controller that directs the pixel dot sources to operate at pixel row locations that are displaced in the traverse direction from those in the adjacent row by the second fixed spacing times a third multiple that is an integer greater than one.

2. The printer of claim 1, wherein the first multiple is 2.

3. The printer of claim 1, wherein the first fixed pixel spacing is equal to the second fixed pixel spacing.

4. The printer of claim 1, wherein the printer includes:

a second printhead having at least two pixel dot sources, which are aligned in the traverse direction with the pixel dot sources of said printhead, the spacing between adjacent pixel dot sources in the direction parallel to an advance direction being the first fixed pixel spacing in the advance direction times said first multiple, the second printhead operating to print a color different from that printed by the printhead.

5. In a printer having a printhead movable in a traverse direction for printing dots onto an array of pixel locations on a printing medium movable in an advance direction, the pixel locations being spaced from each other by a fixed amount in the traverse direction and a fixed amount in the advance direction, said printhead having at least two dot print sources that print dots of a liquid colorant onto the printing medium, the liquid colorant having a fixed time for stabilization on the printing medium, the spacing between adjacent dot print sources being a multiple of said fixed pixel spacing amount in the advance direction, where the multiple is an integer greater than one, the process for printing dots of the colorant onto pixels of said array of pixel locations on said printing medium, comprising the steps of:

printing the dots from selected dot print sources onto non-adjacent pixel locations in the traverse direction such that no adjacent pixels along the traverse direction or along the advance direction are printed during a single traverse movement;

advancing said printing medium said multiple plus at least one said fixed amount in the advance direction, and executing a second traverse movement for printing the dots onto non-adjacent pixel locations in the traverse direction and in the advance direction.

6. In a printer having a printhead movable in a traverse direction for printing droplets of a colorant onto an array of fixed pixel locations on a printing medium movable in an advance direction, the pixel locations being spaced from each other by a fixed amount in the traverse direction and a fixed amount in the advance direction, said printhead having at least two colorant sources, the spacing between adjacent colorant sources in the advance direction being an integer multiple greater than one of the spacings between fixed pixel locations, the process for depositing droplets of the colorant onto pixels in said array of pixel locations on said printing medium, comprising the steps of:

traversing the printhead across the face of the printing medium in a traverse direction perpendicular to the advance direction;

simultaneously depositing droplets of the colorant onto traversely non-adjacent pixels in the traverse direction by the colorant sources;

advancing the printing medium by a multiple of said fixed amount in the advance direction which multiple of said fixed amount is an amount different from the advance direction spacing of the colorant sources; and executing a second traverse movement for depositing droplets of the colorant onto pixels which are non-adjacent in the traverse direction and non-adjacent in the advance direction.

7. The process of claim 6, including the additional step, after the step of advancing, of repeating the steps of traversing and advancing multiple times, to sequentially print a page.

8. The process of claim 6, including the additional step, after the step of traversing and before the step of advancing, of traversing the print head back across the face of the printing medium in the traverse direction without advancing the print head, simultaneously depositing droplets of the colorant such that colorant is not deposited onto traversely adjacent pixels by the colorant sources.

9. The process of claim 8, including the additional step, after the step of advancing, of repeating the steps of traversing the print head across the face, traversing the printhead back across the face, and advancing multiple times, to sequentially print a page.

* * * * *